Nov. 28, 1967    H. E. FERRILL    3,354,896
SAFETY VALVE
Filed Feb. 24, 1965    2 Sheets-Sheet 1
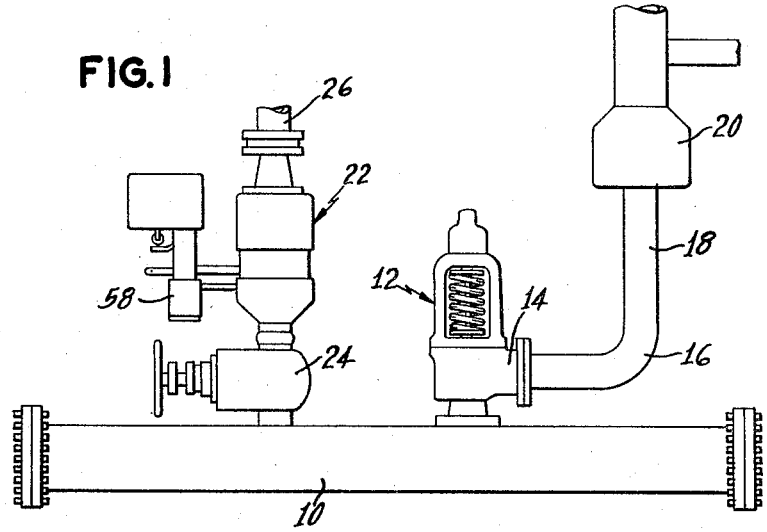
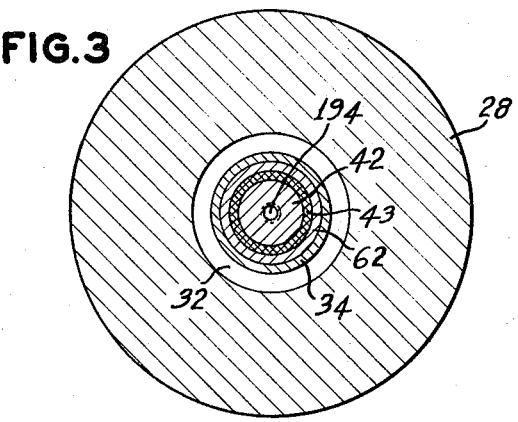
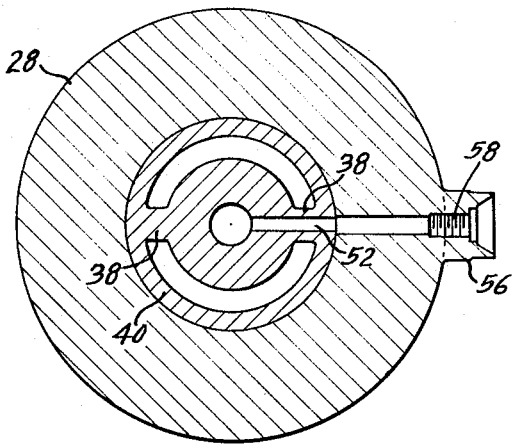
INVENTOR.
HOMER E. FERRILL
BY
George H. Baldwin
ATTORNEY Nov. 28, 1967

H. E. FERRILL 3,354,896

SAFETY VALVE

Filed Feb. 24, 1965

INVENTOR.
HOMER E. FERRILL
BY
George H. Baldwin
ATTORNEY

United States Patent Office 3,354,896
Patented Nov. 28, 1967

3,354,896
SAFETY VALVE
Homer E. Ferrill, Alexandria, La., assignor to Dresser Industries, Inc., Dallas, Tex., a corporation of Delaware
Filed Feb. 24, 1965, Ser. No. 434,910
5 Claims. (Cl. 137—219)

ABSTRACT OF THE DISCLOSURE

A safety valve for the relief of fluid overpressure having aligned inlet and outlet passages with a closure disc and seat components which are removable via the outlet for remote maintenance servicing thereof.

---

This invention relates to steam safety valves and more particularly to a novel and improved steam safety valve of the pilot operated type.

It is the primary object of the present invention to provide a novel and improved pilot operated safety valve adapted for use in protecting a pressure vessel, such as a superheater or the like, from rupturing internal pressures and is particularly adapted for use in a system comprising additional safety valves of the conventional spring loaded type and wherein the pilot operated valve is so constructed and analyzed that, upon discharge of steam therefrom, the reaction forces on the valve due to steam discharge will be aligned with the inlet of the pilot valve thus eliminating any twisting forces on the valve or associated components of the system.

It is further an object of this invention to provide a novel and improved pilot operated safety valve of the type described which will assure tight sealing between the valve disc and seat, particularly when the valve components are at an elevated temperature.

It is further an object of the present invention to provide a novel and improved pilot operated safety valve of the type described which will permit removal of the valve seat from the valve body without requiring the valve body to be removed from the pressure vessel to which it is fixed, thus facilitating reworking of the valve seat when necessary.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings, in which:

FIG. 1 is a diagrammatic view of a system incorporating a pilot operated safety valve of the present invention;

FIG. 3 is a cross-sectional view substantially along the line 3—3 of FIG. 2; and FIG. 4 is a cross-sectional view substantially along the line 4—4 of FIG. 2.

Figure 2:
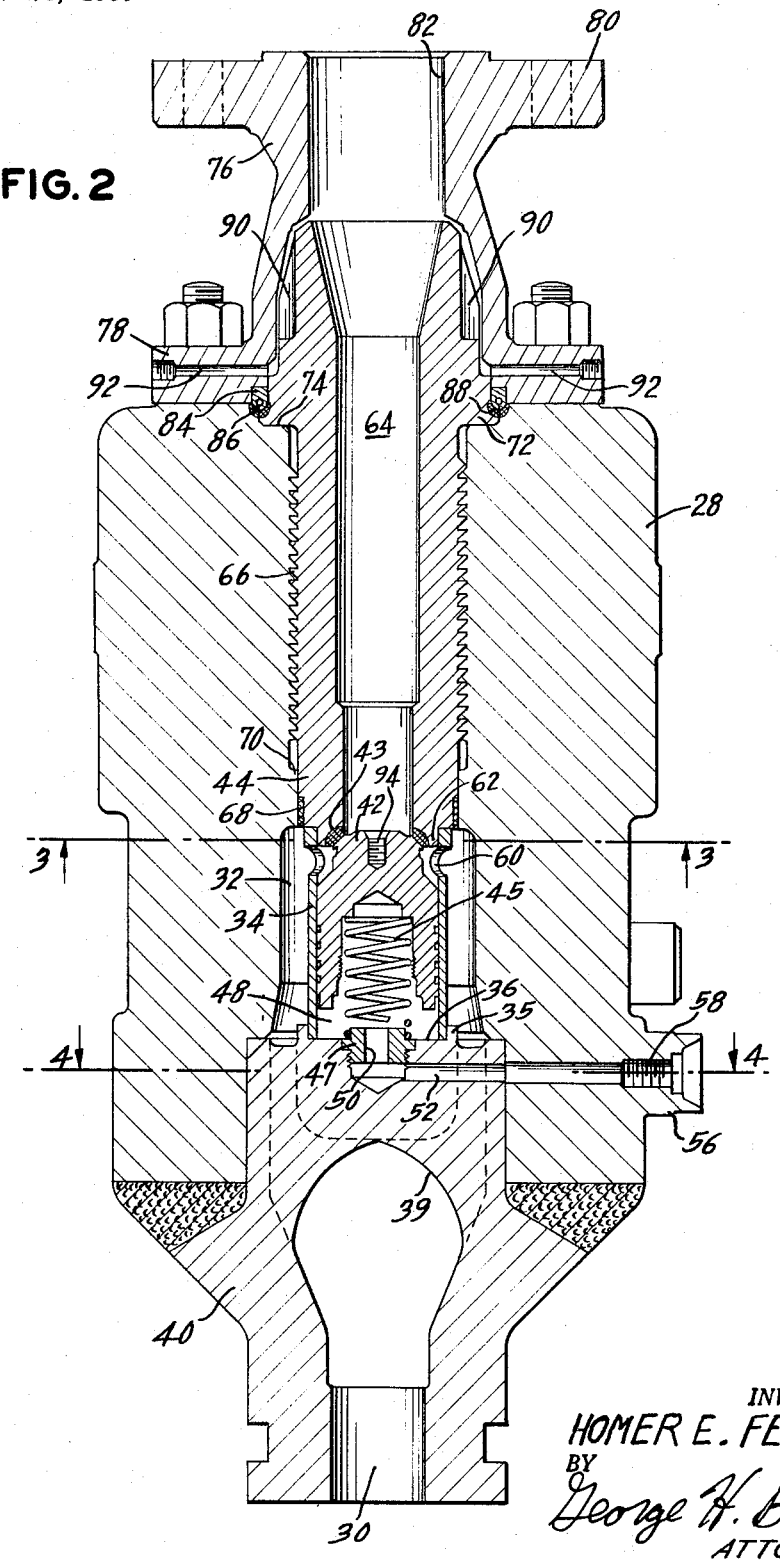
FIG. 2 is a longitudinal, cross-sectional view of a pilot operated safety valve constructed in accordance with the present invention.

With reference to FIG. 1 of the drawings, there is shown at 10 a pressure vessel which may, for example, be a superheater or a superheater header. Such pressure vessels may have internal pressures on the order of 3,000 to 4,500 p.s.i. with steam temperatures in excess of 1000° F. Safety codes require that such pressure vessels be provided with means for relieving the internal pressure of the vessels before the internal pressures reach a value which could cause rupturing of the vessel. Often superheaters and the like are operated close to their limit of pressure so as to achieve maximum system efficiency. It is a common practice to provide such a pressure vessel with a safety valve, as at 12, which may be of the conventional spring-loaded type. While only one such spring-loaded valve has been shown in FIG. 1 it will be understood that it is a common practice to provide a plurality of such valves on a single pressure vessel. The valve 12 is of a conventional type having a discharge outlet 14 extending at right angles to the inlet of the valve which is rigidly fixed to the pressure vessel 12. The valve 12 discharges into an elbow 16 from which extends an upwardly directed riser 18 which may in turn exhaust into a stack 20, whereby steam exhausted from the valve will be finally discharged at a substantial level above the pressure vessel 10 and in a manner to avoid injury to adjacent personnel or facilities.

As heretofore noted, it is commonplace to provide a plurality of spring-loaded safety valves for the protection of a single superheater or header or a manifold fed by two or more boilers. Also, as previously noted, it is not uncommon to operate the pressure vessel at close to the set pressure of the safety valves in order to achieve maximum efficiency. This would normally mean that the various spring-loaded safety valves would open fairly frequently as the pressure within the vessel exceeded the set pressure of the valves. Inasmuch as the discharge of steam through a conventional safety valve will eventually cause wear on the valve seat and other effects which require that the valve seats be serviced, the frequent opening of the plurality of spring-loaded safety valves is not particularly desirable as it will result in a too frequent servicing of these valves. Inasmuch as the servicing of these valves requires a shutdown of the pressure vessel, it will be seen that it is desirable to maintain the frequency of opening the spring-loaded safety valves as low as possible.

Accordingly, it is a known practice to provide, in association with the spring-loaded safety valves, a pilot operated valve also connected to the pressure vessel. The pilot operated valve is set to open at a pressure slightly less than the set pressure of the spring-loaded valves. Accordingly, the pilot operated valve will act to relieve minor over-pressures in the pressure vessel leaving the spring-loaded safety valves to act only in the case of a major over-pressure and thus reducing the frequency of opening of these valves. This will, of course, mean that the pilot operated valve will open rather frequently, thus requiring servicing of its valve seat at prescribed intervals. In prior pilot operated valves used for this purpose, it was common to have the valve seat integral with the valve body with the valve body being mounted in fixed relation to the pressure vessel, as by welding. With reference to FIG. 1 it will be seen that the valve 22 is rigidly connected, as by welding, to the outlet of an isolating gate valve 24, which in turn has its inlet fixed, as by welding, to the pressure vessel 10. When it is desired to service the pilot operated valve, the isolating gate valve 24 is closed, thus preventing steam from entering the valve 22. In prior valves the valve body was welded to the gate valve, and, as noted above, the valve seat was integral with the valve body. If it was desired to service the seat, the servicing operation had to be performed with the valve body and thus the valve seat attached to the gate valve 24. Inasmuch as the vessel 10 was at a very high temperature, the body and thus seat of the pilot operated valve was also at a high temperature. This presented a considerable problem in accurately lapping the the valve seat inasmuch as the seat might be distorted somewhat due to its elevated temperature, and also. the temperature of the seat frequently was so high that lapping compound would not adhere to the seat. Another disadvantage of prior pilot operated valves used in a system such as described herein was that they were side discharge valves, or in other words, the discharge of the valve extended at right angles to the inlet, similar to the arrangement shown in FIG. 1 in connection with the spring-loaded valve 12. Accordingly, as the valve discharged the steam discharging through the riser, such as at 18, provided a reaction force on the elbow, as at 16, which was spaced a substantial distance from the longitudinal center line of the valve. This resulted in a very high twisting force on the pilot operated valve tending to tilt the same and often adversely affecting the connection of the valve to the isolating gate valve. Also these forces would be transmitted through the isolating gate valve to the connection of the same to the pressure vessel. In order to attempt to alleviate this problem, pilot operated valves have been provided with two outlets which were aligned although extending at right angles to the inlet. Even with careful design, however, it was not possible to obtain equal discharge rates through both outlets, and a twisting force on the valve was still present. It will, of course, be realized that for safety reasons, it is necessary that a riser such as indicated at 18 be provided for all safety valves so that the valve will not discharge horizontally whereby the discharged steam could contact nearby personnel with fatal results.

With reference to FIG. 1 it will be seen that the pilot operated valve 22 of this invention has its outlet, indicated at 26, extending in alignment with the inlet of the valve whereby the valve will discharge vertically upwardly, thus eliminating any twisting movements on the valve due to reaction forces of discharging steam. Also, as will now be explained, the valve seat in the pilot operated valve 22 of this invention may readily be removed from the valve body without disconnecting the valve body from the isolation gate valve 24. This permits the valve seat to be serviced in a location remote from the valve body after cooling of the valve seat, thus to facilitate and assure accurate servicing of the seat.

With reference to FIGS. 2 to 4 a pilot operated safety valve constructed in accordance with the present invention comprises an elongated, generally cylindrical body 28 having relatively thick sidewalls consistent with the high pressures handled by the valve. The valve body is provided at its lower end with an inlet passage 30 extending co-axially of the valve body and opening at its upper end into an enlarged chamber 32 within the body 28. The chamber 32 is formed in part by the sidewalls of the valve body and in part by a sleeve 34 disposed co-axially of the inlet passage 30. The lower end of the sleeve 34 is telescopically and concentrically fitted within an annular flange or projection 35 on a wall 36. The wall 36 is, as is clearly shown in FIG. 4, supported in radially inwardly spaced relation to the sidewall of the body 28 by a pair of aligned webs 38, extending radially of the body 28. While the valve body 28, wall 36 and webs 38 might be cast as an integral unit, in the specific embodiment shown, the inlet portion 40 of the valve body is cast integrally with the webs 38 and wall 36 and is then fitted into the lower end of the base of the body and welded thereto.

Telescopically disposed within and slidably guided by the sleeve 34 is a valve disc 42. The disc is normally engaged with a valve seat formed by a hard faced portion 43 at the inner end of a removable bushing 44 which will be described in more detail hereinafter. When there is no pressure exerted on the valve the disc 42 is held in engagement with the seat by a preloaded coil spring 45 one end of which is received within a recess extending inwardly of and from the lower end of the disc 42. The lower end of the spring 45 is engaged over a post or boss 47 provided by a machined insert threadably received within a threaded opening in the side of the wall 36 facing away from the inlet passage 30 of the valve. The lower end of the valve disc 43 is spaced from the wall 36 when the valve disc is seated so as to provide, in cooperation with the imperforate wall of the sleeve 34, a chamber 48. The plug 47 is provided with co-axial bore 50 opening at one end into the chamber 48 and at the other end opening into the bottom of the threaded recess in the wall 36 receiving the plug 47. It will be noted that the inner end of the plug 47 is spaced from the bottom of the recess in the wall 36 receiving the same. The wall 36 is provided with a transverse passage 52 communicating at one end with the bore 50 leading to the chamber 48. The passage 52 extends radially of the wall 36 and through the web 39 and side wall of the body 28 terminating in an internally threaded portion 58 within an outwardly extending boss 56 providing means for connecting the outer end of the passage 52 to a normally closed solenoid valve such as shown at 59 in FIG. 1.

In the operation of the pilot operated valve 22 with the inlet passage 30 connected to a pressure vessel and exposed to the fluid therein, the chamber 32 will be filled with a fluid at a pressure equal to that within the pressure vessel. This fluid passes through ports 60 in and spaced angularly about the sleeve 34 adjacent but above the valve seat 43 and leaks between the outer diameter of the disc 42 and inner wall of the sleeve 34 into the control chamber 48 behind the disc. This fluid in the control chamber 48 will also find its way through the passages 50 and 52 to the solenoid valve 58 which is normally closed. While the disc 42 is closely fitted within the sleeve 34 there is sufficient clearance to permit the leakage path described. So long as the pressure within the control chamber 48 is equal to the pressure within the chamber 32 the disc will remain seated. However, if the solenoid valve 58 is actuated to permit the fluid in the control chamber 48 to be discharged therefrom through the passages 50 and 52, the pressure within the control chamber 48 will be substantially immediately lowered sufficiently that the pressure within the chamber 32 acting on the disc 42 will force the disc downwardly to open the valve. It will be appreciated that the flow area of the passages 50 and 52 and discharge area of the solenoid valve is quite substantially greater than the leakage path between the chamber 32 and the chamber 48, so that as long as the control chamber 48 is vented the valve will remain open. However, when the solenoid valve is actuated to closed position, the pressure within the control chamber 48 will build up rapidly so as to effect raising of the disc 42 to close the valve 22.

The upper end of the sleeve 34 is engaged telescopically and concentrically over an annular projection 62 extending from the lower end of the bushing 44 thus assuring that the sleeve is maintained co-axially of the seat 43 for proper seating of the disc. As will be seen from FIG. 2 the bushing 44 is elongated and generally tubular in configuration. The bushing is provided with a bore 64 providing an outlet passage from the valve seat which extends vertically upwardly and in alignment with the inlet passage 30. The bushing 44 is externally threaded, as at 66, and is received in threaded engagement within a co-axial opening at the upper end of the valve body. The lower end portion of the bushing 66 is provided with an annular hard faced portion 68 extending about its outer circumference. The portion 68 is machined to provide a very close fit within the inner diameter of a radially inwardly extending annular projection or collar 70 which is integral with the valve body 28 and has a cylindrical inner surface disposed co-axially of the body 28. The machined outer surface of the portion 68 closely fits with the machined inner cylindrical surface of the collar 70 to provide accurate, close tolerance location of the inner end of the bushing 44 and thus the valve seat 43. In this connection it will be noted that the hard faced portion 68 and collar 70 are disposed at the inner end of the bushing 44 so as to be next adjacent the seat 43 when the bushing and body are assembled as shown.

The bushing 44 is also provided with a circumferential and radially outwardly extending integral collar 72 disposed between the intermediate threaded portion 66 and the upper end of the bushing. The collar 72 is seated within a counterbore 74 at the upper end of the valve body. Mounted on top of the upper end of the valve body 28 is a discharge collar 76 having, at its lower end, a flange 78 which is bolted to the body 28. The collar 76 has a second flange 80 at its upper end by means of which the flange may be connected to a riser. The opening or bore 82 in the collar 76 is enlarged at its lower end to receive the upper end of the bushing 44 which projects a substantial distance beyond the upper end of the body 28. The bushing 44 is spaced inwardly from the collar 76 except at the lower end of the collar within the flange 78.

The opening through the flange 78 is counterbored at its lower end for the reception of a metal seal ring 84 of the type shown in U.S. Patent No. 3,046,026. This seal ring is generally C-shaped in cross-section with both legs of the C extending downwardly. The upper outer edge of the counterbore 74 on the valve body is chamferred, or in other words is inclined upwardly and outwardly, to provide a conical surface 86 co-axial with the collar 76 and which is wedgingly engageable with one of the legs of the C-shaped seal ring 84. The shoulder or collar 72 on the bushing 44 is provided with an upwardly and inwardly inclined conical surface 88 co-axial with the bushing and which is wedgingly engageable with the inner leg of the C-shaped seal 84. In order to provide a good bearing surface which will not wear and cause leakage the conical surface 88 on the bushing 44 is hard faced, which may be accomplished by weld depositing Stellite. As the discharge collar is drawn down onto the upper end of the body it will force the legs of the seal 84 into engagement with the inclined surfaces 86 and 88 to provide a fluid tight seal against the high pressures within the valve body and assure that there will be no leakage at this point.

The upper end portion of the bushing 44 projecting beyond the body 28 is provided with a plurality of slots 90 extending parallel to the longitudinal center line of the bushing and extending along the exterior thereof. These slots provide means for gripping the bushing with a spanner wrench when it is desired to thread the bushing inwardly or outwardly of the body. Inasmuch as the upper end of the bushing 44 is spaced radially inwardly from the inner wall of the discharge collar 76, it is possible that some moisture might accumulate in the space between the collar and bushing, particularly inasmuch as the discharge path of the valve is vertically upwardly. Accordingly, a pair of drain passages 92 are provided in the flange 78. The drains extend radially of the flange to communicate at their inner ends with the bottom of the space between the bushing 44 and collar 76. The outer ends of the passages 92 are provided with means for connection of the same to drain conduits.

As heretofore noted, the body 28 of the valve is welded to the outlet of an isolation gate valve such as shown at 24 in FIG. 1, or in any event is so arranged relative to the pressure vessel that the heat of the pressure vessel will be readily transferred to the valve body. In prior valves this has created a problem in that this heating of the valve body caused distortion of the valve seat due to unequal thermal gradients about the valve seat. It will be observed that, in accordance with one aspect of this invention, and as shown in FIG. 3, the valve body and associated structure in the immediate area of the valve seat 43 are all of concentric, circular cross-sectional configuration so that there is an equal distribution of material entirely about the axis of the valve seat within planes extending perpendicularly to said axis and passing through the valve seat. In this way there will be no unequal thermal gradients about the valve seat, and any thermal expansion of the valve body and valve seat area will be equal entirely about the axis of the seat thus eliminating any tendency toward seat deformation and possible leakage.

When it is desired to service the valve seat, this may be done without removal of the body 28 from the pressure vessel. In order to remove the seat the discharge collar 76 is first unbolted from the body and then the bushing 44 is unthreaded from the body and removed. Inasmuch as the valve seat is integral with the bushing 44, the machining of the valve seat may be accomplished in a workshop under suitable conditions rather than in the field. Further, the valve seat may be permitted to cool before it is serviced, thus assuring that the refinishing of the seat will be done accurately. It will be observed, also, that the upper end of the valve disc adjacent the seat engaging portion of the disc is provided with a co-axial threaded opening 94 which opens into the discharge passage 64 in the bushing 44. This opening 94 provides a ready means for the engagement of an elongated tool or rod to facilitate installation and removal of the valve disc from the sleeve 34. Additionally, if desired the same tool may be used to depress the valve disc slightly as the bushing 44 is being threaded inwardly or outwardly of the valve body so as to avoid any possible scoring of the mating surfaces on the valve seat and disc.

While only certain preferred embodiments of this invention have been shown and described by way of illustration, many modifications will occur to those skilled in the art and it is, therefore, desired that it be understood that it is intended in the appended claims to cover all such modifications as fall within the true spirit and scope of the invention.

What is claimed as new and what it is desired to secure by Letters Patent of the United States is:

1. In a pilot operated safety valve, an elongated valve body having an axial bore, said bore at one end providing an inlet passage to the valve, a bushing removably engaged within the other end of said bore and forming an outlet passage for the valve in coaxial alignment with said inlet passage, said bushing having means at its inner end providing a valve seat facing inwardly of said body and disposed coaxially of said bore, means providing a wall extending generally transverse to the alignment of said passages and spaced between said seat and said inlet passage, means supporting said wall on said body including a plurality of webs extending radially of said bore, a sleeve disposed coaxially of said seat between said inner end of said bushing and said wall, a valve disc slidably engaged within said sleeve and engaged at one end with said seat, the other end of said disc being spaced spaced from said wall to provide a control chamber, means providing a fluid passage communicating at one end with said control chamber and extending through one of said webs and outwardly through said valve body, and means providing openings in said sleeve in continuous restrictive communication between said inlet passage and said control chamber when said disc is in engagement with said seat.

2. In a safety valve, an elongated body having an axial bore, one end of said bore providing an inlet passage to said valve, a removable bushing threadably engaged within the other end of said bore in alignment with said inlet passage and providing an outlet passage for the valve coaxially aligned with said inlet passage, means providing a valve seat at the inner end of said bushing, a valve disc disposed below and engaged with said seat, means supporting said disc for movement toward and away from said seat, means on said body providing a cylindrical surface disposed coaxially of said seat and next adjacent said seat, a hard faced annular portion on the inner end of said bushing next adjacent said seat tightly and telescopically fitted within said cylindrical surface on the valve body and in cooperation with said cylindrical surface accurately locating said seat relative to the longitudinal axis of said bore, said bushing having a radially outwardly extending flange intermediate its ends engaged with a counterbore at said other end of said bore, said bushing projecting a substantial distance outwardly of the one end of said body corresponding to said other end of said bore, a discharge collar removably mounted on said one end of said valve body and having an enlarged internal portion at its lower end receiving the outwardly projecting end of said bushing, and means providing a fluid-pressure tight seal between said flange bushing and said collar.

3. In a safety valve, an elongated body having an axial bore, one end of said bore providing an inlet passage to said valve, a removable bushing threadably engaged within the other end of said bore in alignment with said inlet passage and providing an outlet passage for the valve coaxially aligned with said inlet passage, means providing a valve seat at the inner end of said bushing, a valve disc disposed below and engaged with said seat, means supporting said disc for movement toward and away from said seat, means on said body providing a cylindrical surface disposed coaxially of said seat and next adjacent said seat, a hard faced annular portion on the inner end of said bushing next adjacent said seat tightly and telescopically fitted within said cylindrical surface accurately locating said seat relative to the longitudinal axis of said bore, said bushing having a radially outwardly extending flange intermediate its ends engaged within a counterbore at said other end of said bore, said bushing projecting a substantial distance outwardly of the one end of said body corresponding to said other end of said bore, a discharge collar removably mounted on said one end of said valve body and having an enlarged internal portion at its lower end receiving the outwardly projecting end of said bushing, means providing a fluid-pressure tight seal between said flange bushing and said collar, the outwardly projecting end of said bushing being spaced radially inwardly from said collar, and means providing a plurality of drain passages extending from the bottom of the space between said collar and bushing radially outwardly through said collar.

4. In a safety valve, a valve body having a longitudinal bore one end of which provides an inlet passage extending inwardly of one end of said valve body, a bushing removably engaged within the other end of said bore, means on the inner end of said bushing providing a valve seat coaxial with said bore, a sleeve mounted at one end on said inner end of the bushing and extending coaxially thereof, and a valve disc slidably received within said sleeve and engaged with said seat, said bushing projecting outwardly from the other end of said body and being provided on its outwardly projecting portion with a plurality of tool engageable slots extending longitudinally thereof and spaced circumferentially thereabout, said bushing further having a radially outwardly extending flange intermediate its ends engaged within a counterbore at said other end of said bore in said body.

5. In a safety valve, an elongated generally cylindrical body having an axial bore, one end of said bore providing an inlet passage to said valve, a removable bushing removably engaged coaxially within the other end of said bore and providing an outlet passage for the valve, means providing a valve seat at the inner end of said bushing, a valve disc disposed below and engaged with said seat, a sleeve coaxial with said bore supporting said disc for movement toward and away from said seat, means on said body and inner end of said bushing mounting said sleeve in radially inwardly spaced relation to said bore, cooperating cylindrical surfaces on the valve body and inner end portion of said bushing accurately locating said seat relative to the longitudinal axis of said bore, said bushing having a radially outwardly extending flange intermediate its ends engaged within a counterbore at said other end of said bore, said bushing projecting a substantial distance outwardly of the one end of said body corresponding to said other end of said bore, a discharge collar removably mounted on said one end of said valve body and having an enlarged internal portion at its lower end receiving the outwardly projecting end of said bushing, and means providing a fluid-pressure tight seal between said flange bushing and said collar, said valve body, bushing and sleeve having concentric circular cross-sections in all planes passing through said seat at right angles to the axis of said bore.

References Cited
UNITED STATES PATENTS

| | | | |
|---|---|---|---|
| 2,055,576 | 9/1936 | Hollerith | 251—44 X |
| 1,265,937 | 5/1918 | Melcher | 137—489.3 |
| 2,445,505 | 7/1948 | Ashton | 251—363 X |
| 2,667,892 | 2/1954 | Gentzel | 137—506 X |
| 2,676,612 | 4/1954 | Stevenson | 137—489.3 |
| 2,976,880 | 3/1961 | Cassarino | 137—219 |
| 3,092,133 | 6/1963 | Clark | 137—220 |
| 3,113,583 | 12/1963 | Fox | 137—220 |
| 3,260,275 | 7/1966 | Armstrong | 137—219 |

FOREIGN PATENTS

| | | |
|---|---|---|
| 655,575 | 1963 | Canada. |

M. CARY NELSON, *Primary Examiner.*

M. O. STURM, *Assistant Examiner.*